(12) United States Patent
Wang et al.

(10) Patent No.: US 10,518,802 B2
(45) Date of Patent: Dec. 31, 2019

(54) METHOD FOR CONTROLLING A POWER STEERING SYSTEM OF A ROAD VEHICLE

(71) Applicant: Automotive Research & Testing Center, Lugong (TW)

(72) Inventors: Zong-Li Wang, Lugong (TW); Jin-Yan Hsu, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 252 days.

(21) Appl. No.: 15/855,659

(22) Filed: Dec. 27, 2017

(65) Prior Publication Data

US 2019/0193779 A1 Jun. 27, 2019

(51) Int. Cl.
| | |
|---|---|
| *B62D 5/00* | (2006.01) |
| *B62D 5/04* | (2006.01) |
| *B62D 5/30* | (2006.01) |
| *B62D 6/08* | (2006.01) |
| *B62D 6/02* | (2006.01) |
| *B62D 5/065* | (2006.01) |

(52) U.S. Cl.
CPC ......... *B62D 5/0484* (2013.01); *B62D 5/0463* (2013.01); *B62D 5/065* (2013.01); *B62D 5/30* (2013.01); *B62D 6/02* (2013.01); *B62D 6/08* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 8,544,570 | B2 * | 10/2013 | Ishii ....................... | A01D 34/64 180/6.5 |
| 8,862,324 | B2 * | 10/2014 | Birsching ............ | B62D 5/0463 180/446 |
| 9,511,796 | B2 * | 12/2016 | Ura ...................... | B62D 5/0835 |
| 2010/0147618 | A1 | 6/2010 | Osonoi et al. | |
| 2013/0199865 | A1 | 8/2013 | Park | |
| 2014/0074355 | A1 | 3/2014 | Kim et al. | |

FOREIGN PATENT DOCUMENTS

CN        103192872 A        7/2013

* cited by examiner

*Primary Examiner* — James M McPherson
(74) *Attorney, Agent, or Firm* — Brinks Gilson & Lione

(57) ABSTRACT

A method for controlling a power steering system of a road vehicle includes: after the road vehicle is started, activating only an EPS subsystem; afterward, activating an EHPS subsystem when a speed of the road vehicle is not higher than a predetermined speed threshold; once the EHPS subsystem is activated, controlling the hydraulic motor of the EHPS subsystem to rotate at a rotational speed lower than a pre-set rotational speed when a torque applied to a steering column is smaller than a predetermined torque threshold.

10 Claims, 2 Drawing Sheets

METHOD FOR CONTROLLING A POWER STEERING SYSTEM OF A ROAD VEHICLE

FIELD

The disclosure relates to a method for controlling a power steering system of a road vehicle with reduced power consumption.

BACKGROUND

A road vehicle (e.g., a bus) may employ a power steering system for enabling a driver to operate a steering wheel with less effort, especially when the vehicle is moving slowly or is starting off, meaning the vehicle is in transition from a stationary state to a moving state. The power steering system typically includes a steering linkage, an electro-hydraulic power steering (EHPS) subsystem and an electric power steering (EPS) subsystem for providing force to a steering box of the vehicle via the steering linkage. Simultaneous operation of the EHPS subsystem and the EPS subsystem may apply force to the steering box, so as to allow the driver to operate the steering wheel without having to put out a significant amount of effort.

SUMMARY

One object of the disclosure is to provide a method for controlling a power steering system of a road vehicle.

According to one embodiment of the disclosure, the power steering system includes an electric power steering (EPS) subsystem and an electro-hydraulic power steering (EHPS) subsystem for providing force to a steering box of the road vehicle. The method is implemented by a control system of the road vehicle. After the road vehicle is started, the method includes:

activating only the EPS subsystem;

receiving a speed reading indicating speed of the road vehicle from a speedometer of the road vehicle;

after the EPS subsystem is activated, further activating the EHPS subsystem when the speed reading indicates that the speed of the road vehicle is not higher than a predetermined speed threshold;

once the EHPS subsystem is activated, receiving a torque reading indicating torque applied to a steering column of the power steering system from a torque sensor that is disposed on the steering column;

controlling a hydraulic motor of the EHPS subsystem to rotate at a rotational speed higher than a pre-set rotational speed when the torque reading indicates that the torque is not smaller than a predetermined torque threshold; and controlling the hydraulic motor of the EHPS subsystem to rotate at a rotational speed lower than the pre-set rotational speed when the torque reading indicates that the torque is smaller than the predetermined torque threshold.

According to another embodiment of the disclosure, after the road vehicle is started, the method includes:

activating only the EPS subsystem;

receiving a speed reading indicating speed of the road vehicle from a speedometer of the road vehicle;

after the EPS subsystem is activated, further activating the EHPS subsystem when the speed reading indicates that the speed of the road vehicle is lower than a predetermined speed threshold; and once the EHPS subsystem is activated, deactivating the EHPS subsystem when the speed reading indicates that the speed of the road vehicle is higher than the predetermined speed threshold.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
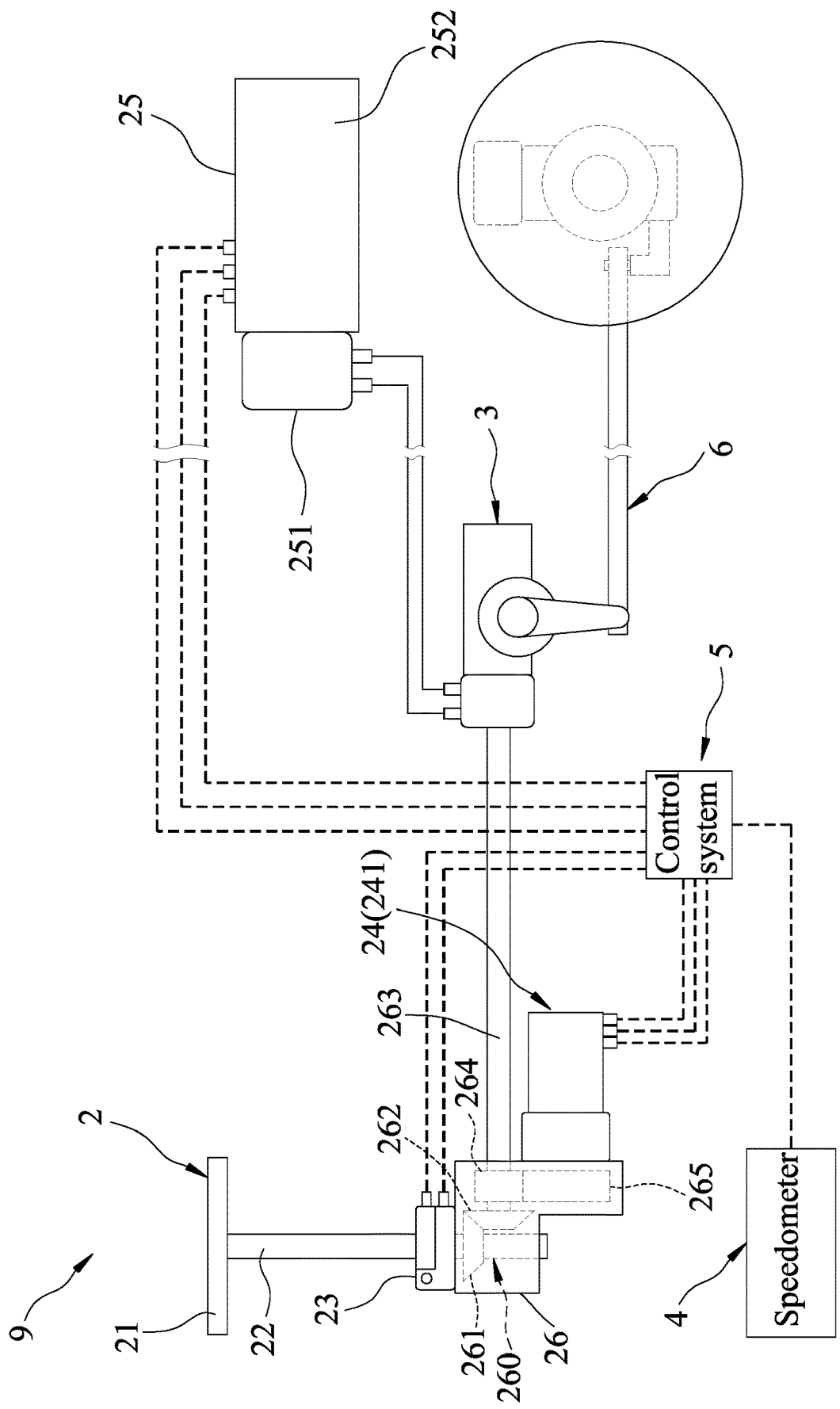
FIG. 1 is a schematic diagram illustrating selected components of a road vehicle, according to one embodiment of the disclosure.

FIG. 1 is a schematic diagram illustrating selected components of a road vehicle 9 according to one embodiment of the disclosure. In this embodiment, the road vehicle 9 is embodied using a bus, but other vehicles may also be employed in other embodiments.

Components of the road vehicle 9 illustrated in FIG. 1 include a power steering system 2, a steering box 3, a speedometer 4, a control system 5, and a Pitman arm 6 that is attached to the steering box 3.

The power steering system 2 includes a steering wheel 21, a steering column 22 that is connected to the steering wheel 21, a torque sensor 23 that is disposed on the steering column 22, an electric power steering (EPS) subsystem 24 that is indirectly linked with the steering box 3, an electro-hydraulic power steering (EHPS) subsystem 25 that is directly linked with the steering box 3, a power transmission subsystem 26 that is connected between the steering column 22 and the steering box 3 and directly linked with the EPS subsystem 24.

The power transmission subsystem 26 includes a pair of bevel gears 260. Specifically, the pair of bevel gears 260 includes a first bevel gear 261 that is connected to the steering column 22, and a second bevel gear 262 that meshes the first bevel gear 261. The power transmission subsystem 26 further includes a linkage shaft 263 that interconnects the second bevel gear 262 and the steering box 3, a rotating gear 264 mounted on the linkage shaft 263, and a transmission gear 265 that meshes the rotating gear 264 and that is driven by the EPS subsystem 24.

When the steering wheel 21 is manually operated by a driver, a torque is applied thereto. The torque is then transmitted through the steering column 22, the pair of bevel gears 260 and the linkage shaft 263 to the steering box 3. The torque sensor 23 is operable to detect the torque applied to the steering column 22 (i.e., the torque applied by the driver via the steering wheel 21), and to generate a torque reading indicating the torque thus detected.

The EPS subsystem 24 includes a power motor 241, which may be operated to generate a force to be provided to the steering box 3 based on the torque applied to the steering column 22 for allowing the steering wheel 21 to be operated by the driver with less effort. Specifically, the force (i.e., torque) generated by the power motor 241 is transmitted through the transmission gear 265, the rotating gear 264, and the linkage shaft 263 to the steering box 3.

The EHPS subsystem 25 includes a hydraulic pump 251, and a hydraulic motor 252 that drives operations of the hydraulic pump 251. When the EHPS subsystem 25 is activated, the hydraulic pump 251 provides a force directly to the steering box 3. As a result of the operations of the EPS subsystem 24 and the EHPS subsystem 25, an accumulated torque applied to the steering box 3 may be made larger.

It may be noted that a maximum force that can be generated by the power motor 241 is generally smaller than that of the hydraulic motor 252 (partly due to the size difference), and a power consumption of the power motor 241 is generally smaller than that of the hydraulic motor 252.

The steering box 3 is driven by the torque generated and applied thereto by one or both of the EPS subsystem 24 and the EHPS subsystem 25 for generating an angular motion. The angular motion is converted, by the Pitman arm 6 attached to the steering box 3, to a linear motion to steer some or all of a number of wheels (not depicted in the drawings) of the road vehicle 9. The steering box 3 is well known in the technical field of the road vehicle, in particular in the technical field of buses, and details thereof are omitted herein for the sake of brevity.

The speedometer 4 is for detecting a speed of the road vehicle 9, and is to generate a speed reading indicating the speed of the road vehicle 9 thus detected.

The control system 5 is coupled to the torque sensor 23, the EPS subsystem 24, the EHPS subsystem 25 and the speedometer 4. Additionally, the control system 5 may be embodied using an electronic control unit (ECU) or an embedded system of the road vehicle 9.

Figure 2:
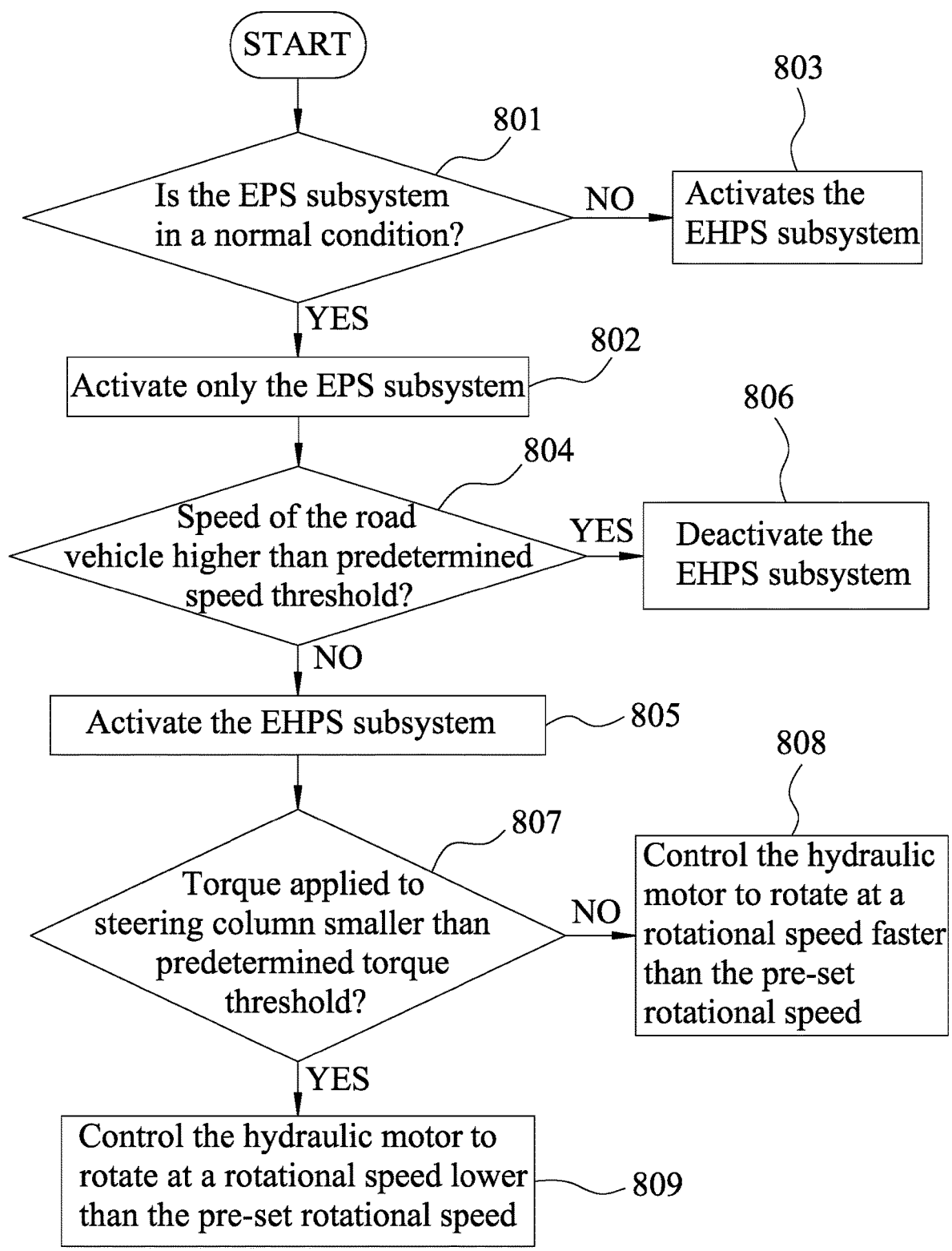
FIG. 2 is a flow chart illustrating steps of a method for controlling a power steering system of the road vehicle.

FIG. 2 is a flow chart illustrating step of a method for controlling the power steering system 2 of the road vehicle 9 according to one embodiment of the disclosure. In this embodiment, the steps of the method are implemented by the control system 5.

In step 801, after the road vehicle 9 is started (i.e., an engine thereof is started), the control system 5 performs an inspection for the EPS subsystem 24, and receives a result of the inspection therefrom. In this embodiment, the control system 5 obtains a number of parameters associated with the EPS subsystem 24, such as an encoder signal of the power motor 241, a Hall effect sensor signal, a three-phase motor driving signal of the power motor 241, and a power source voltage of circuitry of the control system 5, and determines whether each of the parameters is in a normal range.

When the result of the inspection indicates that the EPS subsystem 24 is in a normal condition (i.e., the EPS subsystem 24 can operate normally to perform its normal functions), the flow proceeds to step 802. Otherwise, when the result of the inspection indicates that the EPS subsystem 24 is in an abnormal condition (i.e., one or more functions that the EPS subsystem 24 should be able to perform cannot be performed normally or properly), the flow proceeds to step 803.

In step 802, the control system 5 activates only the EPS subsystem 24. That is to say, at this stage, when the steering wheel 21 is operated, only the EPS subsystem 24 is employed to provide a force to the steering box 3.

In step 803, since the EPS subsystem 24 is deemed unable to function normally, the control system 5 only activates the EHPS subsystem 25. That is to say, at this stage, when the steering wheel 21 is operated, only the EHPS subsystem 25 is employed to provide a force to the steering box 3, and the EHPS subsystem 25 remains activated until the road vehicle 9 is switched off. In this embodiment, the control system 5 controls the hydraulic motor 252 of the EHPS subsystem 25 to rotate at a constant rotational speed in step 803.

After step 802, in step 804, the control system 5 receives the speed reading from the speedometer 4, and compares the speed of the road vehicle 9 indicated by the speed reading and a predetermined speed threshold to determine whether the speed of the road vehicle 9 is higher than the predetermined speed threshold. In this embodiment, the predetermined speed threshold is 10 km/hr.

When it is determined that the speed of the road vehicle 9 is higher than the predetermined speed threshold, the flow proceeds to step 806. Otherwise (i.e., the speed of the road vehicle 9 is not higher than the predetermined speed threshold), the flow proceeds to step 805.

In step 805, the control system 5 activates the EHPS subsystem 25. In step 806, the control system 5 deactivates the EHPS subsystem 25. It should be noted that the control system 5 may continuously receive the speed reading from the speedometer 4 to determine whether the speed of the road vehicle 9 is higher than the predetermined speed threshold (i.e., step 804 may be repeated). It should be noted that deactivating the EHPS subsystem 25 in step 806 means that keeping the EHPS subsystem 25 inactive when the EHPS subsystem 25 is originally not activated, and means turning off the EHPS subsystem 25 when the EHPS subsystem 25 is originally activated.

It is noted that when the road vehicle 9 is in a starting motion (i.e., the road vehicle 9 transitions from a stationary state to a moving state) and the road vehicle 9 is moving at a low speed (e.g., lower than the predetermined speed threshold), a torque needed to turn the steering wheel 21 is significantly larger than that when the road vehicle 9 is moving relatively fast (i.e., at a speed above the predetermined speed threshold). As a result, when it is determined that the road vehicle 9 is moving at a low speed, both the EPS subsystem 24 and the EHPS subsystem 25 are activated so as to simultaneously provide force to the steering box 3. On the other hand, when the road vehicle 9 is moving at a speed higher than the predetermined speed threshold, the torque needed to turn the steering wheel 21 becomes smaller, and the EHPS subsystem 25 which provides a greater force with greater power consumption may be deactivated to reduce the overall power consumption.

After step 805, in step 807, the control system 5 receives the torque reading from the torque sensor 23, and compares the torque with a predetermined torque threshold so as to determine whether the torque is smaller than the predetermined torque threshold. In this embodiment, the predetermined torque threshold is 7 Nm.

When it is determined that the torque, indicated by the torque reading, is not smaller than the predetermined torque threshold, the flow proceeds to step 808. Otherwise (i.e., the torque is smaller than the predetermined torque threshold), the flow proceeds to step 809.

In step 808, the control system 5 controls the hydraulic motor 252 of the EHPS subsystem 25 to rotate at a rotational speed that is faster than a pre-set rotational speed. In step 809, the control system 5 controls the hydraulic motor 252 of the EHPS subsystem 25 to rotate at a rotational speed that is slower than the pre-set rotational speed.

It is noted that step 807 is implemented in the context that the speed of the road vehicle 9 is lower than the predetermined speed threshold, and the EHPS subsystem 25 is activated and is providing force to the steering box 3. Additionally, the torque applied to the steering column 22 is indicative of the effort that is put out by the driver attempting to operate the steering wheel 21, and is a torque needed to turn the steering wheel 21 subtracted by the torque provided by the EHPS subsystem 25.

Subsequently, when the torque detected is large, it may be deduced that even with the EHPS subsystem 25 activated, the driver still needs to put out a large amount of effort to turn the steering wheel 21, and therefore more assistance from the power steering system 2 is needed. As a result, the hydraulic motor 252 is configured to rotate faster for providing relatively large torque to the steering box 3. On the other hand, when the torque detected is small, it may be deduced that the assistance provided by the EHPS subsystem 25 at the time is more than enough. As a result, the hydraulic motor 252 may be configured to rotate at a lower rotational speed for reducing power consumption.

After operations of steps 806, 808 or 809 are implemented, the flow may go back to step 804, in which the control system 5 determines whether the speed of the road vehicle 9 is higher than the predetermined speed threshold (e.g., to determine whether the road vehicle 9 is slowing down and runs at a speed below the predetermined speed threshold or is speeding up and runs at a speed above the predetermined speed threshold), and to implement the corresponding operations. The above described process may then be repeated during the entire drive (journey), and is terminated after the road vehicle is switched off.

To sum up, the embodiments of the disclosure provide a way to utilize the power steering system 2 of the road vehicle, such that the EHPS subsystem 25, a relatively power consuming component, may be switched between activation and deactivation based on a speed of the road vehicle 9 and a torque applied to the steering column 22 (i.e., applied by the driver). That is to say, when a condition of the road vehicle 9 implies that less power steering assistance is required by the driver, the EHPS subsystem 25 may be deactivated or configured to operate with a reduced power output.

As a result, while still providing the power steering functionalities to the driver, the power consumed by the power steering system 2 controlled using the method as described in the disclosure may be significantly reduced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling a power steering system of a road vehicle, the power steering system including an electric power steering (EPS) subsystem and an electro-hydraulic power steering (EHPS) subsystem for providing force to a steering box of the road vehicle, the method being implemented by a control system of the road vehicle and comprising steps of, after the road vehicle is started:
    activating only the EPS subsystem;
    receiving a speed reading indicating speed of the road vehicle from a speedometer of the road vehicle;
    after the EPS subsystem is activated, further activating the EHPS subsystem when the speed reading indicates that the speed of the road vehicle is not higher than a predetermined speed threshold;
    once the EHPS subsystem is activated, receiving a torque reading indicating torque applied to a steering column of the power steering system from a torque sensor that is disposed on the steering column;
    controlling a hydraulic motor of the EHPS subsystem to rotate at a rotational speed higher than a pre-set rotational speed when the torque reading indicates that the torque is not smaller than a predetermined torque threshold; and
    controlling the hydraulic motor of the EHPS subsystem to rotate at a rotational speed lower than the pre-set rotational speed when the torque reading indicates that the torque is smaller than the predetermined torque threshold.

2. The method of claim 1, further comprising steps, prior to the step of activating only the EPS subsystem, of performing an inspection for the EPS subsystem and generating a result of the inspection,
    wherein the control system implements the step of activating only the EPS subsystem when the result of the inspection indicates that the EPS subsystem is in a normal condition.

3. The method of claim 2, further comprising a step of activating the EHPS subsystem when the result of the inspection indicates that the EPS subsystem is in an abnormal condition;
    wherein the control system does not implement the step of activating only the EPS subsystem when the result of the inspection indicates that the EPS subsystem is in the abnormal condition.

4. The method of claim 1, further comprising a step, once the EHPS subsystem is activated, of deactivating the EHPS subsystem when the speed reading indicates that the speed of the road vehicle is higher than the predetermined speed threshold.

5. The method of claim 1, wherein the predetermined torque threshold is 7 Nm.

6. The method of claim 1, wherein the predetermined speed threshold is 10 km/hr.

7. A method for controlling a power steering system of a road vehicle, the power steering system including an electric power steering (EPS) subsystem and an electro-hydraulic power steering (EHPS) subsystem for providing force to a steering box of the road vehicle, the method being implemented by a control system of the road vehicle and comprising steps of, after the road vehicle is started:
    activating only the EPS subsystem;
    receiving a speed reading indicating speed of the road vehicle from a speedometer of the road vehicle;
    after the EPS subsystem is activated, further activating the EHPS subsystem when the speed reading indicates that the speed of the road vehicle is lower than a predetermined speed threshold; and
    once the EHPS subsystem is activated, deactivating the EHPS subsystem when the speed reading indicates that the speed of the road vehicle is higher than the predetermined speed threshold.

8. The method of claim 7, further comprising steps, prior to the step of activating only the EPS subsystem, of performing an inspection for the EPS subsystem and generating a result of the inspection, wherein the control system implements the step of activating only the EPS subsystem when the result of the inspection indicates that the EPS subsystem is in a normal condition.

9. The method of claim 8, further comprising a step of activating the EHPS subsystem when the result of the inspection indicates that the EPS subsystem is in an abnormal condition,
wherein the control system does not implement the step of activating only the EPS subsystem when the result of the inspection indicates that the EPS subsystem is in the abnormal condition.

10. The method of claim 7, wherein the predetermined speed threshold is 10 km/hr.

* * * * *